United States Patent [19]
Nowicki et al.

[11] 3,978,520
[45] Aug. 31, 1976

[54] MAGNETIC HEAD CLEANING TAPE AND METHOD

[75] Inventors: John V. Nowicki, St. Paul; John D. Hakanson, South St. Paul, both of Minn.

[73] Assignee: Minnesota Mining and Manufacturing Company, St. Paul, Minn.

[22] Filed: Nov. 29, 1974

[21] Appl. No.: 528,354

[52] U.S. Cl. .................................. 358/10; 15/210 R; 178/DIG. 4; 274/47; 358/4; 360/128; 360/132
[51] Int. Cl.² .......................................... G11B 5/11
[58] Field of Search ............ 358/4, 10; 178/DIG. 4; 360/128, 137, 132; 274/47; 15/210 R

[56] References Cited
UNITED STATES PATENTS

| | | |
|---|---|---|
| 3,069,815 | 12/1962 | Valentine............................ 274/47 |
| 3,439,922 | 4/1969 | Howard ................. 274/47 |
| 3,767,210 | 10/1973 | Havens ................. 360/128 |
| 3,789,452 | 2/1974 | Nemoto ............. 15/210 R |
| 3,810,230 | 5/1974 | Orlowski............................ 360/128 |
| 3,823,947 | 7/1974 | Sasaki................................. 360/128 |
| 3,931,643 | 1/1976 | Kuroe ................................. 360/128 |

*Primary Examiner*—Howard W. Britton
*Attorney, Agent, or Firm*—Alexander, Sell, Steldt & DeLaHunt

[57] ABSTRACT

Magnetic heads of color video tape recorder (vtr) machines are cleaned without harmful abrasion by means of a novel magnetic head cleaning tape carrying a color bar signal. Abrupt appearance of the color bar test pattern at the video monitor permits cessation of the cleaning operation immediately upon complete removal of foreign matter and without harmful abrasion of the heads.

7 Claims, 1 Drawing Figure

U.S. Patent   Aug. 31, 1976   3,978,520
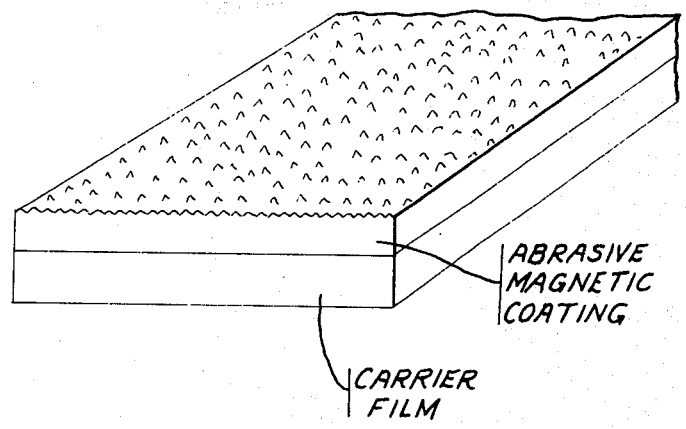

MAGNETIC HEAD CLEANING TAPE AND METHOD

This invention relates to magnetic recording and reproducing of signals and more particularly to the cleaning of the magnetic heads employed in such operations. In one major aspect the invention relates to means and method for cleaning the magnetic heads used in the reproduction of color video programs. In a related aspect the invention relates to the avoidance of undue wear of magnetic heads during the cleaning process. In a more specific aspect the invention relates to novel head cleaning magnetic tape in cassette form, e.g. for use in helical vtr cassette machines in the ¾ inch "U-Matic" format, with which rapid and complete cleaning of the magnetic heads may safely and readily be accomplished.

The gradual buildup of deposits of foreign matter on magnetic heads of both audio and video magnetic tape recorders during operation of the machines is due primarily to the gradual transfer to the head surface of binder and magnetic pigment from the tape and is unavoidable. These deposits interfere with recording and playback operations and must periodically be removed. Cleaning with solvent-moistened swabs, adequate for most audio recorders, is not well adapted to the video machines. For use wth the latter, special tape products have been developed which are much more abrasive than standard magnetic recording tapes and which rapidly remove the deposits by abrasive action. An example of such a material is Sony HC Tape, available in cassette form, at the filing date of this application, from Sony Corporation of America. The tape comprises a plastic carrier film coated with magnetic iron oxide in a polymeric binder. Tested at 60 Hz. in a 3000 oersted maximum applied field, the tape shows a $H_c$ value of 258 oersteds and a $B_r$ value of 560 gauss. Significantly, it has a surface roughness, as measured on the Bendix "Proficorder" testing machine using a 2.5 micro-meter diamond stylus, of $16.5 \times 10^{-2}$ micro-meters (reported as arithmetic average) or $69.0 \times 10^{-2}$ micro-meters (reported as peak-to-valley). In contrast, recording tapes for vtr cassettes are invariably found to have a surface roughness no greater than about $3 \times 10^{-2}$ (arithmetic average) or $10 \times 10^{-2}$ (peak-to-valley) micro-meters. Maximum smoothness is particularly desirable in tapes containing magnetic chromium oxide, which is particularly hard and abrasive.

Magnetic heads used in audio tape recorders have generally been made of mumetal or permalloy and are relatively easily abraded. Those used in video tape recorders are of ferrite material which is of much greater hardness, but due to the extremely close dimensional tolerances of vtr operation are at least equally susceptible to damage by abrasion. It is therefore desirable to apply the rough and highly abrasive head cleaning tape for the minimum time required to remove the foreign matter, so as to avoid abrasive wear and deformation of the heads themselves. With prior art products such as the Sony HC Tape, completion of the cleaning operation can be determined only by removing the head cleaning tape, inserting a recorded tape, and estimating from the resulting picture whether or not complete cleaning has been accomplished.

The present invention makes possible the accurate estimation of an end-point in cleaning the magnetic heads of vtr machines, whereby to achieve effective cleaning while avoiding harmful abrasion of the heads and in a single operational sequence. A typical magnetic head cleaning tape structure of the present invention is illustrated in perspective in the accompanying drawing showing a segment of a carrier film coated on one surface with an abrasive magnetic coating as hereinafter described.

Although applicable to reel and other type systems, the invention is especially useful in connection with helical vtr cassette type machines, and in particular those employing the "U-Matic" format hereinbefore mentioned, and will for convenience be described in terms suitable thereto.

In accordance with the invention, there is provided, preferably in cassette form, a magnetic recording tape product having sufficient abrasivity for rapid and thorough removal of deposits of foreign matter from the head surfaces while at the same time providing magnetically recorded signals capable of producing at the video monitor a high quality pattern. For color vtr systems, a color test bar pattern is preferred.

A color bar test pattern may be produced electronically or otherwise, by means well known in the art, and recorded directly onto the tape from a recording head or transferred to the tape from a pre-recorded tape or other source. The display obtained with the head cleaning tape of this invention is substantially identical with that obtained on playback of an industry standard magnetic recording tape carrying a similarly recorded signal. On the contrary, attempts to impress a color bar test pattern on prior art head cleaning tapes, such as the Sony HC Tape previously mentioned, have been found to result in a largely haphazard and unsynchronized display showing no more than small isolated patches of distinguishable color.

The following specific example will serve to illustrate but not to limit the practice of the invention. All proportions are in parts by weight unless otherwise indicated:

EXAMPLE

A coating composition is prepared to the following recipe:

| | |
|---|---|
| cyclohexanone | 130 |
| dispersant | 7.0 |
| lubricant | 1.7 |
| chrome pigment | 120 |
| aluminum oxide pigment | 1.2 |
| binder solution | 45.0 |
| resin solution | 11.0 |
| 2-butanone | 70 |
| cross-linking agent | 3.9 |

The dispersant is a lower alkyl polypropyleneoxy quaternary ammonium compound such for example as "Emcol" CC-42 of Witco Chemical Corporation. The lubricant is butyl myristate containing a small proportion of free myristic acid. The chrome pigment is Du-Pont "Crolyn" chromium dioxide pigment having a nominal particle size distribution of 95% under one micron, not more than 5% above 10 microns, and showing a surface area of 16 to 30 square meters per gram. The aluminum oxide, an optional but preferred component, is a non-magnetic abrasive grade powder having a particle size distribution similar to that of the chromium dioxide.

The binder solution contains one part of an adherent polyester urethane polymer of neopentyl glycol, polyepsiloncaprolactone diol, and p,p-diphenylmethane diisocyanate in three parts of 2-butanone. The resin solution contains 30 parts of high molecular weight tough, hard copolymer of bisphenol A and epichlorohydrin (phenoxy resin PKHH from Union Carbide Corp.) in 70 parts of 2-butanone. The cross-linking agent is a polymethylene polyphenyl isocyanate ("PAPI", from Upjohn Co.) having an average of 3.2 isocyanate groups per molecule.

The pigments are initially intimately dispersed in the cyclohexanone containing the dispersant and lubricant by prolonged grinding. The resin solution and one-tenth of the binder solution are added with further grinding, followed by the remainder of the binder solution. The cross-linking agent is then added and the well-mixed dispersion is promptly coated out on nominally 80 gauge (20 micro-meter) polyester film, subjected to longitudinal magnetic orientation, and dried by heating at 60°C for 1½ minutes, followed by 1½ minutes at 85°C. The coating subsequently undergoes additional hardening. The dispersion is applied by rotogravure coating using a 5C knurl roll followed by a smoothing blade and the resultant finished coat has a measured thickness of 4.3 micro-meters. The tape exhibits an $H_c$ value of 575 oersteds and a $B_r$ value of 1300 gauss. Values of at least 300 oersteds $H_c$ and 800 gauss $B_r$ are required; values of at least 500 oersteds $H_c$ and 1200 gauss $B_r$ are preferred. The surface roughness measures $8.9 \times 10^{-2}$ (arithmetic average) and $31.8 \times 10^{-2}$ (peak-to-valley) micro-inches, being approximately only one-half the measured roughness of the Sony HC Tape coating.

For a given structure, the abrasivity of the surface is a function of the surface roughness of the coating. The abrasivity should be sufficient to provide rapid removal of foreign matter from the heads. At the same time, the surface roughness must be held within a range permitting an effective signal to be recorded, i.e. within the limits of $5 \times 10^{-2}$ to $12 \times 10^{-2}$ (arithmetic average) and $20 \times 10^{-2}$ to $47 \times 10^{-2}$ (peak-to-valley) micro-meters.

Surface roughness may be varied by a number of techniques. For example, roughness may be increased by reducing the grinding time, regulating the smoothing bar, using less effective dispersants, or incorporating additional quantities of non-magnetic abrasive particles. Analogously, surface roughness may be reduced by prolonged grinding, heavier smoothing, super-calendering prior to final hardening, or the like.

The product is slit to width and installed in a cassette, and a color test bar signal is recorded on the tape. The cassette is inserted for playback in a vtr machine having badly fouled heads. The display at the video monitor is initially completely haphazard, non-synchronized, noisy and snowy. Within about 10 seconds the display suddenly clarifies and synchronizes to present a clear, well-defined color test bar pattern, whereupon the machine is immediately stopped. The cassette is removed and replaced with a cassette containing prerecorded standard tape; the clarity and synchronization of the resulting display indicates that the heads have been completely cleaned.

The hardness of the binder is sufficient to provide rigid support for the pigment particles whereby to maintain their original coated orientation during travel of the tape past the heads.

It will be understood that the foregoing example is illustrative only and that various substituent materials and in various proportions as well known in the art may replace those of said example.

What is claimed is as follows:

1. Method of cleaning the magnetic heads of a video tape recorder having a video monitor, comprising playing in said recorder a magnetically recordable magnetic head cleaning tape having a surface coating comprising magnetizable particles in a hard non-magnetizable binder, said coating having an $H_c$ value of at least 300 oersteds and a $B_r$ value of at least 800 gauss, and having a surface roughness of between $5 \times 10^{-2}$ and $12 \times 10^{-2}$ (arithmetic average) and between $20 \times 10^{-2}$ and $47 \times 10^{-2}$ (peak-to-valley) micro-meters, and said tape carrying a magnetically recorded video test pattern; continuing the play until the display produced on said video monitor resolves into the clear synchronized test pattern; and then immediately stopping play.

2. Method of claim 1 wherein said magnetizable particles are magnetic chromium dioxide and wherein said $H_c$ value is at least 500 oersteds and said $B_r$ value is at least 1200 gauss.

3. Method of claim 2 wherein said recorded test pattern is a color bar test pattern and said recorder is a color video tape recorder.

4. As a new article of manufacture, a magnetic head cleaning tape product including a carrier having bonded thereto a coating comprising magnetizable particles in a hard non-magnetizable binder, said coating having an $H_c$ value of at least 300 oersteds and $B_r$ value of at least 800 gauss, and having a surface roughness of between $5 \times 10^{-2}$ and $12 \times 10^{-2}$ (arithmetic average) and between $20 \times 10^{-2}$ and $47 \times 10^{-2}$ (peak-to-valley) micro-inches; and said tape carrying a magnetically recorded video test pattern.

5. Tape product of claim 4 wherein said magnetizable particles are magnetic chromium dioxide and wherein said $H_c$ value is at least 500 oersteds and said $B_r$ value is at least 1200 gauss.

6. Tape product of claim 5 wherein said recorded test pattern is a color bar test pattern.

7. Tape product of claim 5 wherein said coating includes non-magnetic abrasive particles.

* * * * *